June 6, 1961 V. P. HONEISER 2,987,706

SIGNAL DETECTOR

Filed May 14, 1958 3 Sheets-Sheet 1

INVENTOR
VLADIMIR P. HONEISER
BY [signature]
ATTORNEY

June 6, 1961 — V. P. HONEISER — 2,987,706

SIGNAL DETECTOR

Filed May 14, 1958 — 3 Sheets-Sheet 2

INVENTOR
VLADIMIR P. HONEISER
BY [signature]
ATTORNEY

INVENTOR
VLADIMIR P. HONEISER
BY [signature]
ATTORNEY

United States Patent Office 2,987,706

Patented June 6, 1961

2,987,706
SIGNAL DETECTOR

Vladimir P. Honeiser, Paramus, N.J., assignor to International Telephone and Telegraph Corporation, Nutley, N.J., a corporation of Maryland Filed May 14, 1958, Ser. No. 735,267
3 Claims. (Cl. 340—173)

This invention relates to signal detecting devices and in particular to a system for detecting and emphasizing the minimums in the envelope of a pulse train.

In data processing systems and some forms of counting devices it is often necessary that the system count or identify small elements or particles which are bunched together. In such arrangements difficulties are experienced in providing means to recognize the elements as individual items or to define the elements one from the other. An example of such a problem arises in data processing systems where the data is stored on a film in the form of coded dotted rasters. In order for the system to extract the intelligence from the coded dots, the presence or absence of the dots, obviously, must be recognized. In an ideal situation where the dots and the spaces between the dots are well defined by black and clear portions, the readout is a straight forward scanning operation with a device of the flying spot scanner variety. In practice, however, it has been found that these dots have edges which actually are fuzzy or indefinite in nature. The periphery of the fuzzy areas associated with each dot extend far enough to overlap or become adjacent to the fuzzy areas belonging to the surrounding dots. A straight forward scanning operation of such a dotted film raster does produce a pulse train whose envelope shows peaks for the dots or dark film points and minimums for the overlapping gray or fuzzy areas. However because the minimums do not sharply define the peaks, a clipping circuit, to which the last-mentioned signal might be applied, very often does not provide a series of pulses indicative of the presence or absence of the dots on the dotted raster. In film data storage lack of sharp definition arises because the film density is rarely uniform and the light intensity of the beam varies over different portions as the dots are produced on the film. Therefore the clipping level is very difficult to determine, since a dot signal amplitude on one portion of the film might have a lesser value than the amplitude of a minimum between dot signals on another portion of the film. This will become more apparent in connection with the description of the invention and FIG. 2.

In devices which are used to count small elements or particles such as blood counting devices and pollen counting devices, the present state of the art is such that the size of the particle is taken as an average size in order that the output signals can be read out. This assumed average is necessary in order to determine the number of particles or define these particles. Obviously, since the particles are actually not the same size, a true count or true definition is not arrived at using these last-mentioned prior art systems.

It becomes clear that a detecting arrangement for counting or defining small elements which can define the elements irrespective of a basic non-linearity in a storage medium, such as the film described above, and a system which can define small elements irrespective of their size would be very desirable.

It is therefore an object of this invention to provide an improved system for detecting the minimums in the envelope of a pulse train.

It is a further object to provide a system for identifying small elements irrespective of non-linearities of the storage medium which contains such elements.

It is a further object to provide a detecting arrangement for detecting small elements irrespective of the difference in size of the elements.

In accordance with the main feature of the present invention there is provided a means to translate a pulse train into a continuous signal having amplitude peaks which are characterized with non-uniform slopes corresponding to element intensity and uniform slopes corresponding to lack of element intensity.

Another feature of the present invention is the provision of a differentiating circuit in conjunction with the last-mentioned feature to provide sharp pulses in accordance with the non-uniform slopes and substantially no pulse in accordance with the uniform slopes.

Another feature of the present invention is the provision of logic circuitry to enable the user to receive a single pulse identifying an element for any one line of scanning.

The foregoing and other objects and features of this invention and the manner of attaining them will become more apparent and the invention itself will be best understood by reference to the following description of an embodiment of the invention taken in conjunction with the accompanying drawings.

Figure 1:
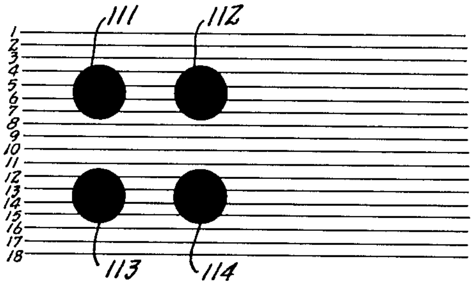
FIG. 1 is a pictorial of a portion of an ideal dotted raster with scanning lines passing therethrough.
Figure 2:
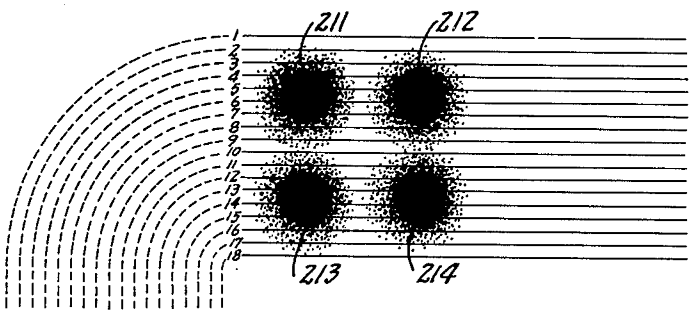
FIG. 2 is a pictorial of a portion of an actual dotted raster.
Figure 3:
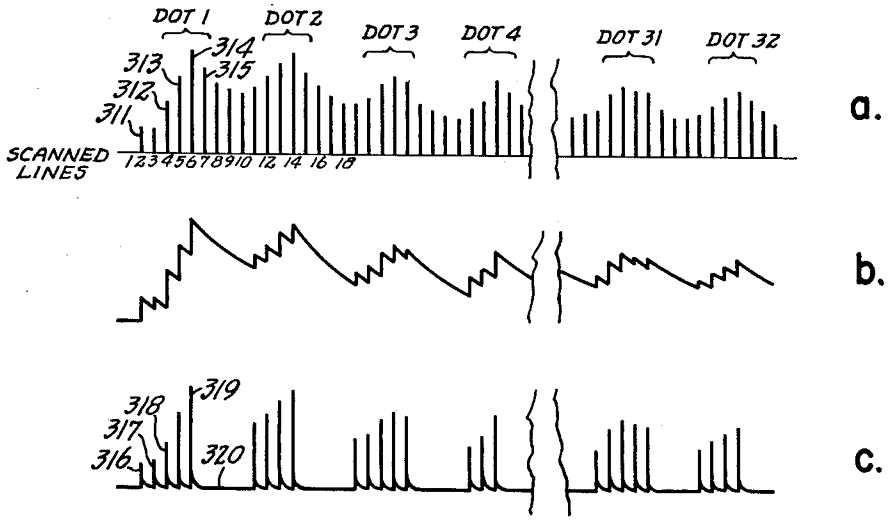
FIG. 3 shows three graphic illustrations of signals passing in the system.

In FIG. 1 there are shown four dots 111, 112, 113 and 114. These dots represent elements of an ideal dotted raster. The lines running through the dots numbered 1 through 18 are scanning lines of a video scanner device. In FIG. 2 there are shown four dots 211, 212, 213 and 214. The four dots of FIG. 2 are elements of an actual dotted raster where high density dot packing is used. It will be noted that the areas between the main dotted portions are fuzzy or indefinite such that the gray portions overlap or are intermingled. The lines numbered 1 through 18 through the dots of FIG. 2 are also scanning lines of a video scanner device. The curved dotted lines running from the scanning lines 1 through 18 have been arranged so that the pulses as shown by FIG. 3 are aligned with these dotted tie-over lines for purposes of descriptive clarification of the system. In FIG. 3*a* the selected pulses of the scanning device are shown. FIG. 3*a* depicts gated or selected pulses generated by the video scanner as it scans the dots of FIG. 2 as well as other pulses which result from similar scanning lines running over additional dots of the raster not shown. The pulses actually only represent the first dots or the index row dots shown in FIG. 6. This is true because of the particular application of the illustrative embodiment. In another application, by proper gating, every dot horizontally can be represented by a pulse. It will be noted that the amplitude of the pulses representing dots 3, 4, 31 and 32 in FIG. 3*a* have a smaller amplitude than the pulses representing dots 1 and 2, and, as will be explained later, this is very often the case when the film and/or dots have a non-linear density. FIG. 3*b* shows the signal output from a peak pulse detector whose input is the pulse train of FIG. 3*a*. FIG. 3*c* shows the differentiated pulses which are the output from a differentiation circuit whose input is the signal of FIG. 3*b*.

Figure 4:
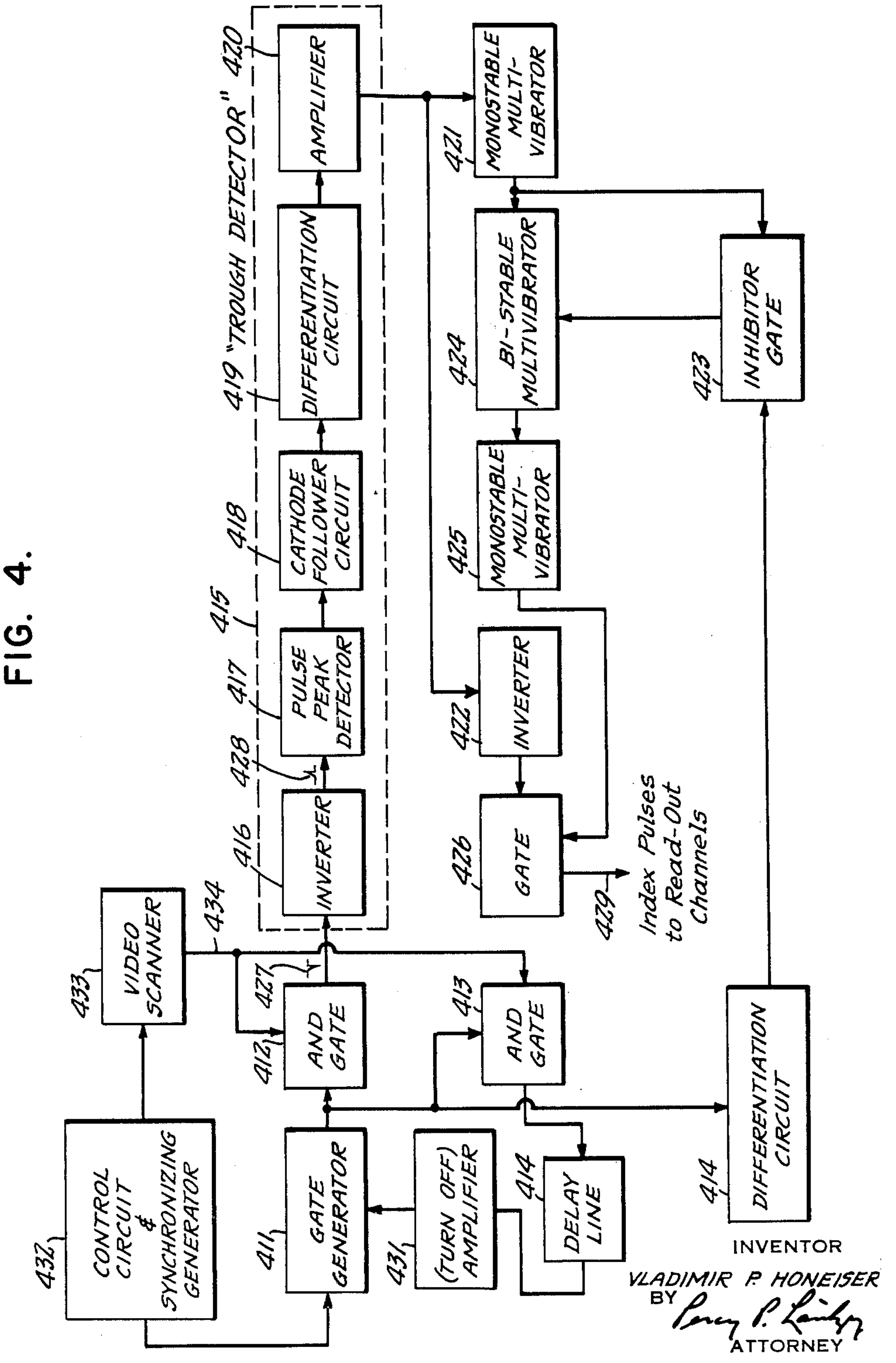
FIG. 4 is a block diagram of a typical embodiment of the invention.

FIG. 4 shows a block diagram of a circuit which can be used to count or identify the dots of a dotted raster. In FIG. 4 there is a gate generator at 411 which is coupled to a first "and" gate 412, to a second "and" gate 413, and to a differentiation circuit 414. To the "and" gates 412 and 413 there is coupled a video signal passing along the line 434 to the "and" gates 412 and 413. The output of the "and" gate 412 is coupled to the trough detector 415. The trough detector consists of an inverter 416 which accepts the signals from the "and" gate 412. The inverter 416 is coupled to a peak pulse detector 417 which is in turn coupled to a cathode follower circuit 418. The output of the cathode follower is coupled to a differentiation circuit 419 which in turn is coupled to an amplifier 420. The output of the amplifier 420 is coupled to a monostable multivibrator 421 and to an inverter 422. The monostable multivibrator 421 has the output of its transferred or "on" side coupled to the inhibitor gate 423 and coupled to the first input of the bistable multivibrator 424. The output of the differentiating circuit 414 is also coupled to the inhibitor gate 423. The output of the inhibitor gate 423 is coupled to the second input of the bistable device 424. The bistable device 424 conducts on a first side as a result of a pulse from the monostable multivibrator 421 and conducts on the other side as a result of a pulse from the inhibitor gate 423. The side of the bistable device that is conducting as a result of pulses from the monostable multivibrator 421 is coupled to the monostable multivibrator 425. The transferred side of monostable multivibrator 425 is coupled to the gate 426. The outputs of the gate 426 are the index pulses to be used in this embodiment, but could be the pulses representing elements to be counted.

Figure 5:
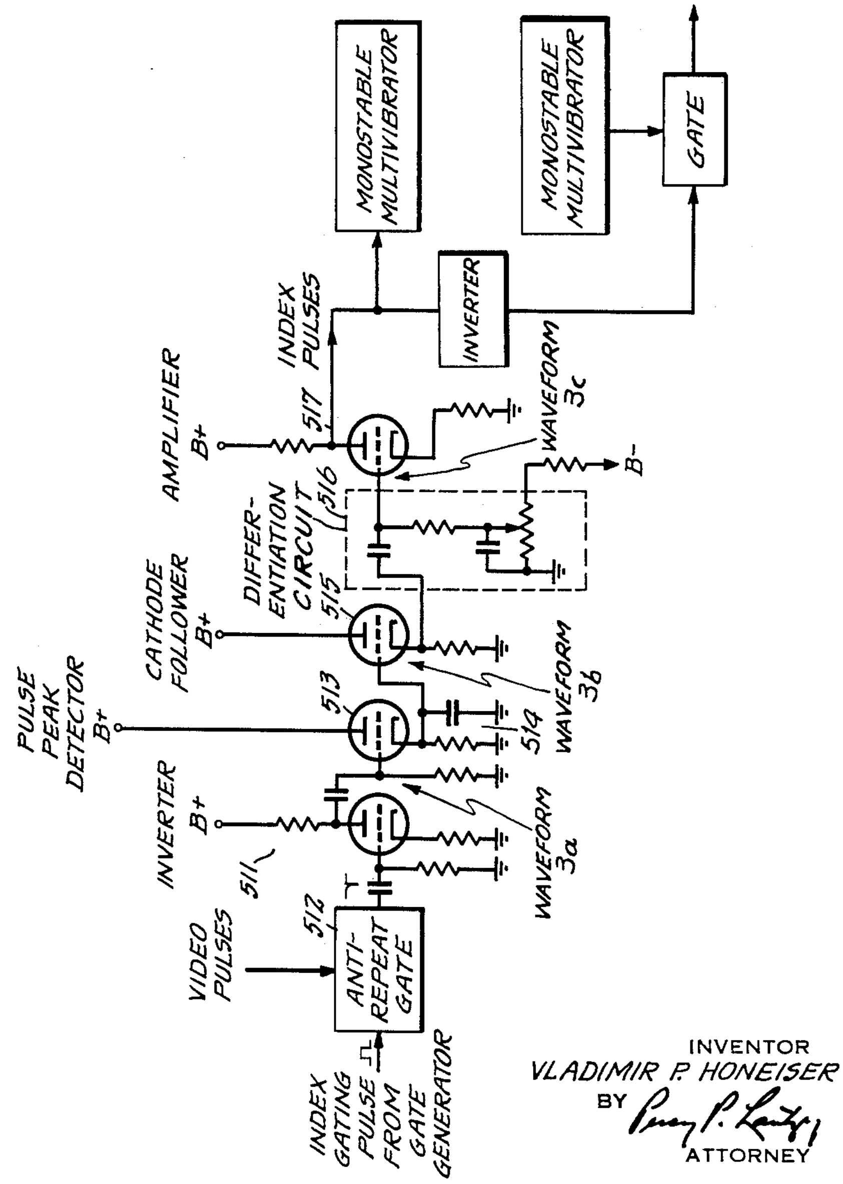
FIG. 5 is a wiring diagram of the trough detector.

FIG. 5 is a wiring diagram of the trough detector 415 of FIG. 4. The inverter 511 is capacitance coupled to the gate 512. The output of the inverter 511 is taken from the anode and is capacitance coupled to the grid of the peak pulse detector 513. The output of the peak pulse detector is from the parallel resistor-capacitor circuit 514 which is coupled to the grid of the cathode follower circuit 515. The cathode follower circuit 515 is coupled to the differentiation circuit 516 whose output is coupled to the grid of the amplifier 517. The amplifier 517 is the same amplifier as depicted in FIG. 4 by the block 420.

Referring to FIG. 1, in particular, for a better understanding of the invention there are shown four ideal raster dots 111 through 114. It will be noted that these dots are clearly defined, having ample clear space between the dots. If the dotted raster of the films in data processing arrangements were as shown in FIG. 1, the task of defining or counting these dots would be a simple one. It would merely be a matter of scanning these dots with a video scanner, such as a flying spot scanner, and detecting the difference between the black and clear portions of the film. Unfortunately, in actual practice the dots of the raster appear on the film as shown in FIG. 2. It will be noted that in FIG. 2 the dots are the more intense dark areas of larger areas which cannot be labeled clear portions of the film. In other words, there are fringe areas that are generated in taking of a picture of a dot and these fringe areas appear as gray areas surrounding the intensely black portions of the actual dot. These fringe or gray areas are sufficiently wide as to overlap one another in a dotted raster where high density dot packing is desired, and therefore distinguishing between dark and clear areas becomes somewhat difficult. An illustration of the problem is clearly depicted in FIG. 2.

Figure 6:
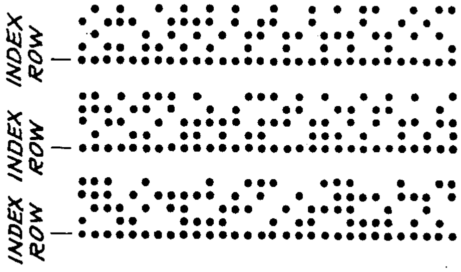
FIG. 6 is a pictorial of the dotted raster of the illustrated embodiment.

It is to be assumed that if a dotted raster, a portion of which is shown in FIG. 2, is being examined with the use of the circuitry of FIG. 4, there will result initially a pulse train as depicted in FIG. 3*a*. The pulse train of FIG. 3*a* results from a video scanner scanning the dotted raster including the dots 211 and 213 of FIG. 2 and the video signal resulting therefrom being gated to select only the pulses representing the dots 211 and 213. Since there may be a "keystoning" effect of the raster or ripple in the vertical lines of dots, the gate pulse from 411 must be adjusted to a proper width. The width should be the width in dots of the departure of the column from the vertical. In other words, in creating dots on film by means of a cathode ray tube often the inherent characteristics of the system cause the dots on the film to lie other than in a straight vertical line. Obviously, if the gate pulse is merely the width of a raster pulse and the pulses do not lie one under the other, certain pulses or portions thereof could be missed during a scan. In the particular embodiment discussed herewith, for illustrative purposes in explaining the operation of this invention, the circuitry is designed to scan the raster and determine if there are 32 dots in a vertical row under dot 211. The dotted raster which is used in conjunction with this system is a raster that is made of three sections of 32 dots vertically and five dots horizontally making the total dotted raster of 32 by 15 dots. The problem to be accomplished in this particular operation is to decide when the scanner device is actually looking at the raster. The first row of each of the three sections of the dotted raster, as shown in FIG. 6, is called the index line. Each of these three lines always has 32 dots vertically. As can be seen from FIG. 6, the other four dot positions, horizontally in the various rows, do not necessarily contain dots therein. The omission of the dots in these dots positions, makes it possible to use a code to store and transmit intelligence.

As the flying spot scanner or video scanner device passes over the dots 211 and 213 of FIG. 2 and further over the remaining dots in the index row under dots 211 and 213 (which are not shown) there will be a series of pulses transmitted. The video signals are gated to select only the pulses representing the index pulses such as 211 and 213 and these selected pulses are represented by the pulse train of FIG. 3*a*. It will be noted by comparing FIG. 3*a* to FIG. 2 that scanning line 2 merely engages the outer edges of the fringe area of dot 211 and therefore a very small pulse results.

As the scan line is subjected to greater black intensity, for instance, scan line 4, there results a larger pulse. Scan line 6 which passes virtually through the center of the dot causes a substantially large pulse to be transmitted. An examination of FIG. 3*a* will clearly indicate that if this pulse train were passed to a clipping circuit for the purpose of clipping off the high amplitude pulses to thereby easily determine the presence or absence of a dot, the clipping level for dot 3 might be lower than the amplitude of the pulses being transmitted in the "gray" area between dots 1 and 2. If such were the case there would be no distinction between dots 1 and 2 or if the clipping amplitude were raised to distinguish dots 1 and 2 then dot 3 might not register. This situation points up to the undesirability of readily using a clipping circuit. The reason that dot 4 and dot 32 are characterized by amplitudes much lower than dot 1, is that in point of fact the film has not been subjected to an equal amount of light since the intensity of the light on the cathode ray tube face varies and because of the non-linearity of the film. The variation in light intensity and the non-linearity of the film having given rise to this irregularity, as described above, gives rise to the problem of determining whether or not there has been a definition of a dot.

The video scanner 433 having generated a pulse train passes the pulse train along the line 434 of FIG. 4 to the first and second "and" gates 412 and 413. As each horizontal scan begins there is also transmitted to the "and" gate 412 from the gate generator 411 a gating pulse whose width will be substantially more than the dot 211 as explained above to compensate for "keystoning" and/or ripple. With the gating pulse having been transmitted during each scan to the "and" gate 412, the "and" gate 412 is opened to transmit for each scan the respective pulses which when refined are shown on FIG. 3a. In other words, if the beam of the scanning device passes along scan line 2 and detects the dark area of dot 211 there is initiated a pulse which is defined to be the pulse 311 of FIG. 3a. The scanning operation in combination with the gating pulse operates continuously to provide the pulses 312, 313, 314 and 315 which identify dot 1. These pulses are transmitted from the "and" gate 412 in the form of negative pulses as depicted by the pulse illustration 427. The negative pulses 427 being received at the inverter 416 are inverted to be passed therefrom as positive pulses depicted by the pulse 428. The pulses from the inverter are represented in FIG. 3a. This pulse train of FIG. 3a is passed to the pulse peak detector which converts the pulse train of FIG. 3a into a continuous signal as depicted by FIG. 3b. It will be noted that in FIG. 3b that the continuous signal has a non-uniform slope for the portions of the pulse train which represent the dots and a substantially uniform slope, being only slightly exponential, for the portions of the pulse train which represent the gray areas between the dots. The continuous signal as depicted by FIG. 3b is passed from the pulse peak detector 417 to the cathode follower circuit 418. From the cathode follower circuit 418 the continuous signal of FIG. 3b is passed to the differentiation circuit 419. The continuous signal of FIG. 3b is differentiated in the circuit 419 to produce a series of pulse signals depicted by FIG. 3c. It will be noted that in FIG. 3c the gray areas or the areas between the dots which should be clear are represented by substantially zero voltage. Actually in the amplifier circuit 420 there is a clipping operation which prevents the differentiated signals from going negative and appearing to have the base as shown in FIG. 3c.

The differentiated signal is amplified at 420 and passed along parallel paths to the monostable multivibrator 421 and the inverter 422.

The first signal passed through the trough detector is rejected. For instance, the differentiated signal 316 of FIG. 3c would be the first pulse to be passed to the monostable multivibrator 421. This would cause the monostable multivibrator to be transferred which in turn would cause the bistable multivibrator 424 to be transferred. The voltage shift or pulse accompanying the transfer of the bistable multivibrator 424 causes the monostable multivibrator 425 to be transferred which opens the gate 426 for as long a period as the monostable multivibrator 425 remains transferred. By proper circuit design of the monostable multivibrator 425 the gate 426 can be held open for a predetermined amount of time after the reception of the first differentiated pulse at 421. The first differentiated pulse to pass to 421 and start the chain reaction of the multivibrators 421, 424 and 425. This first pulse passes to the gate 426 through the inverter 422 at a time prior to the arrival of a pulse traveling through the multivibrator chain. The inherent delay in the multivibrator chain of the first pulse keeps the gate 426 closed. Since the gate 426 is not opened by the first pulse which passes to the output, the first pulse is ineffective. The monostable multivibrator 425 is transferred for at least a long enough period of time to hold the gate 426 open and to pass the next differentiated pulse 317 of FIG. 3c. If the monostable multivibrator 425 returns to the off or reset side between the differentiated pulses 317 and 318 of FIG. 3c, the pulse 318 will not pass through the gate 426. The bistable device 424 will not fire the monostable multivibrator 426 again until it has been reset by the completion or lagging edge of the gate pulse passing to the differentiation circuit 414 which initiates a pulse through the inhibitor gate 423 to reset the multivibrator 424. The inhibitor 423 is closed each time the monostable multivibrator 421 is transferred to insure that the bistable multivibrator 424 cannot be reset while there are differentiated pulses being passed to the monostable multivibrator 421. The monostable multivibrator 421 has a transfer period sufficiently long to insure that the inhibitor gate 423 is closed to the reset pulse initiated by the end of the gate. This "end of the gate" pulse to reset the bistable device 424 passes through the inhibitor only during the gray areas or periods of substantially no voltage such as 320 of FIG. 3c.

If other delay means are used in addition to the monostable multivibrator 425 or in place of the monostable multivibrator 425 the gate 426 can be opened to pass any particular differentiated pulse, say, for instance, the most significant differentiated pulse 319 representing dot 1 in FIG. 3c. It becomes clear from the above discussion that the bistable multivibrator 424 initiates the opening of the gate 426. Since the bistable multivibrator 424 will not be reset until there is a gray area, or substantially no voltage such as depicted by a portion of the curve 320 of FIG. 3c, only one pulse representing a dot is passed through the gate 426 to the output line 429. Of course, if the monostable multivibrator 425 has a transferred period long enough to accept two differentiated pulses it is conceivable that there could be two differentiated pulses representing a dot, but this is a matter of design and the monostable multivibrator 425 can be designed to open the gate for a period long enough to only receive one differentiated pulse.

As explained above in order to be sure that the indexed dots are properly considered in the scanning operation even though there may be a "keystoning" or ripple effect, the gating pulse from 411 is made substantially wider than the dots on the dotted raster. However, once the video signal is received indicating that the dot has been recognized the "and" gate 413 passes a pulse to the delay line 430 which in turn passes a briefly delayed signal to the amplifier 431 to turn off the gate generator 411. The "and" gate 413 is used in addition to the gate 412 because it can be adjusted to saturation so that reliability of shut off is obtained even on weak dots. The control circuit 432 functions in the obvious role of initiating a scanning operation and simultaneously or at a predetermined time initiating a gate signal from the gate generator 411. The output on the line 429 is a series of single pulses 32 in this embodiment, each representing a dot in the index line of the raster. This series of pulses can be counted with any normal counting circuit or device and then recorded to cause some other operation.

Although the invention has been described in connection with a circuit for identifying the index row of a raster the invention in fact can and is used with other arrangements whereby small elements or particles are to be counted. For instance, in a blood counting operation a blood smear is arranged on a plate to be viewed by a microscope in conjunction with a video scanner. The operation will be identical with the operation described above excepting that the gating signal may have to be arranged to gate for a different time in view of the possible size of the blood cells. However, this system does recognize the end of an element as depicted by the voltage 320 of FIG. 3c. The length of the blood cell can be an arbitrary length and there will be certain recognized differences between the cells and therefore a definition of the cells to be counted. Another application is the use of this detector to emphasize the outline of targets which are bunched together as a PPI radar display. By detecting the echos at the input stage to the display device, the edges of the targets could be intensified to define the number of targets.

While I have described above the principles of my invention in connection with specific apparatus, it is to be clearly understood that this description is made only by way of example and not as a limitation to the scope of my invention as set forth in the objects thereof and in the accompanying claims.

I claim:

1. A detector for detecting elements of a pattern wherein each of said elements is disposed contiguous with adjacent elements thereby reducing element definition comprising a video scanner device, said video scanner device disposed to scan said pattern to produce a video signal varying in accordance with element intensity and lack of element intensity, gating means coupled to said video scanner to gate said video signals and transmit therethrough selected video signals, pulse peak detector means coupled to said gate means to translate said selected video signals into a continuous signal having amplitude peaks characterized by non-uniform slopes corresponding to element intensity and substantially uniform slopes corresponding to lack of element intensity, differentiation means coupled to said peak pulse detector to differentiate said continuous signal to produce sharp pulses for each of said elements with substantially no pulses therebetween to emphasize the definition of said elements, amplifier means coupled to said differentiation circuit to amplify said differentiated pulses and logic circuitry means coupled to said amplifier to reject the first differentiated pulse indicative of an element and select a single differentiated pulse to represent a single element.

2. A detector for detecting elements according to claim 1, further including gate control circuitry means to terminate said gating action as soon as a video pulse is recognized.

3. A detector for detecting elements according to claim 1, wherein said logic circuitry means includes a chain of multivibrator circuits serially coupled to be rendered conducting one after another and an output gating circuit which is rendered open subsequent to the first differentiated pulse having reached the output gating circuit input.

References Cited in the file of this patent

UNITED STATES PATENTS 2,685,615 Biddulph ---------------- Aug. 3, 1954